(12) United States Patent
Iijima et al.

(10) Patent No.: US 12,447,564 B2
(45) Date of Patent: Oct. 21, 2025

(54) SOLDER ALLOY, SOLDER BALL, AND SOLDER JOINT

(71) Applicant: Senju Metal Industry Co., Ltd., Tokyo (JP)

(72) Inventors: Yuuki Iijima, Tokyo (JP); Hiroshi Okada, Tokyo (JP); Shunsaku Yoshikawa, Tokyo (JP); Takashi Saito, Tokyo (JP); Kanta Dei, Tokyo (JP); Takahiro Matsufuji, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 519 days.

(21) Appl. No.: 17/912,384

(22) PCT Filed: Mar. 10, 2021

(86) PCT No.: PCT/JP2021/009530
§ 371 (c)(1),
(2) Date: Sep. 16, 2022

(87) PCT Pub. No.: WO2021/187271
PCT Pub. Date: Sep. 23, 2021

(65) Prior Publication Data
US 2023/0129147 A1    Apr. 27, 2023

(30) Foreign Application Priority Data
Mar. 19, 2020   (JP) .................................. 2020-048691

(51) Int. Cl.
C22C 13/00 (2006.01)
B23K 35/02 (2006.01)
B23K 35/26 (2006.01)

(52) U.S. Cl.
CPC ........ *B23K 35/262* (2013.01); *B23K 35/0244* (2013.01); *C22C 13/00* (2013.01)

(58) Field of Classification Search
CPC ............... C22C 13/00; C22F 3/16; C22F 1/16
See application file for complete search history.

(56) References Cited

U.S. PATENT DOCUMENTS

| | | | |
|---|---|---|---|
| 7,282,175 B2 | 10/2007 | Amagai et al. | |
| 8,847,390 B2 | 9/2014 | Hashino et al. | |
| 9,527,167 B2 | 12/2016 | Ohnishi et al. | |
| 9,780,055 B2 | 10/2017 | Yamanaka et al. | |
| 10,821,557 B2 | 11/2020 | Ribas et al. | |
| 2003/0024733 A1 | 2/2003 | Aoyama et al. | |
| 2009/0129970 A1 | 5/2009 | Sung | |
| 2009/0304545 A1 | 12/2009 | Tanaka et al. | |
| 2014/0061287 A1* | 3/2014 | Ohnishi | H01L 24/13 420/560 |
| 2019/0157535 A1* | 5/2019 | de Avila Ribas | H01L 24/32 |
| 2020/0384577 A1 | 12/2020 | Sakamoto et al. | |

FOREIGN PATENT DOCUMENTS

| | | | |
|---|---|---|---|
| CN | 101342642 A | 1/2009 | |
| EP | 1468777 A1 | 10/2004 | |
| EP | 2692478 A1 | 2/2014 | |
| JP | 2004141910 A | 5/2004 | |
| JP | 2008518791 A | 6/2008 | |
| JP | 4144415 B2 | 9/2008 | |
| JP | 2009506203 A | 2/2009 | |
| JP | 2010537 A | 1/2010 | |
| JP | 5030442 B2 | 9/2012 | |
| JP | 201427122 A | 2/2014 | |
| JP | 5633837 B2 | 12/2014 | |
| KR | 1020140025406 A | 3/2014 | |
| TW | 655296 B | 4/2019 | |
| WO | 2007023288 A2 | 3/2007 | |
| WO | 2014170963 A1 | 10/2014 | |
| WO | 2020021967 A1 | 1/2020 | |

* cited by examiner

*Primary Examiner* — Jessee R Roe
(74) *Attorney, Agent, or Firm* — The Webb Law Firm

(57) ABSTRACT

Provided are a solder alloy, a solder ball, and a solder joint which have an excellent pin contact performance and a high bonding strength. The solder alloy has an alloy composition consisting of, by mass %, Ag: 0.8 to 1.5%, Cu: 0.1 to 1.0%, Ni: 0.01 to 0.10%, and P: 0.006% to 0.009%, with the balance being Sn. The alloy composition preferably satisfies the following relations (1) and (2): $2.0 \leq Ag \times Cu \times Ni/P \leq 25$, $0.500 \leq Sn \times P \leq 0.778$. Ag, Cu, Ni, P, and Sn in the relations (1) and (2) each represent the contents (mass %) in the alloy composition.

18 Claims, 1 Drawing Sheet

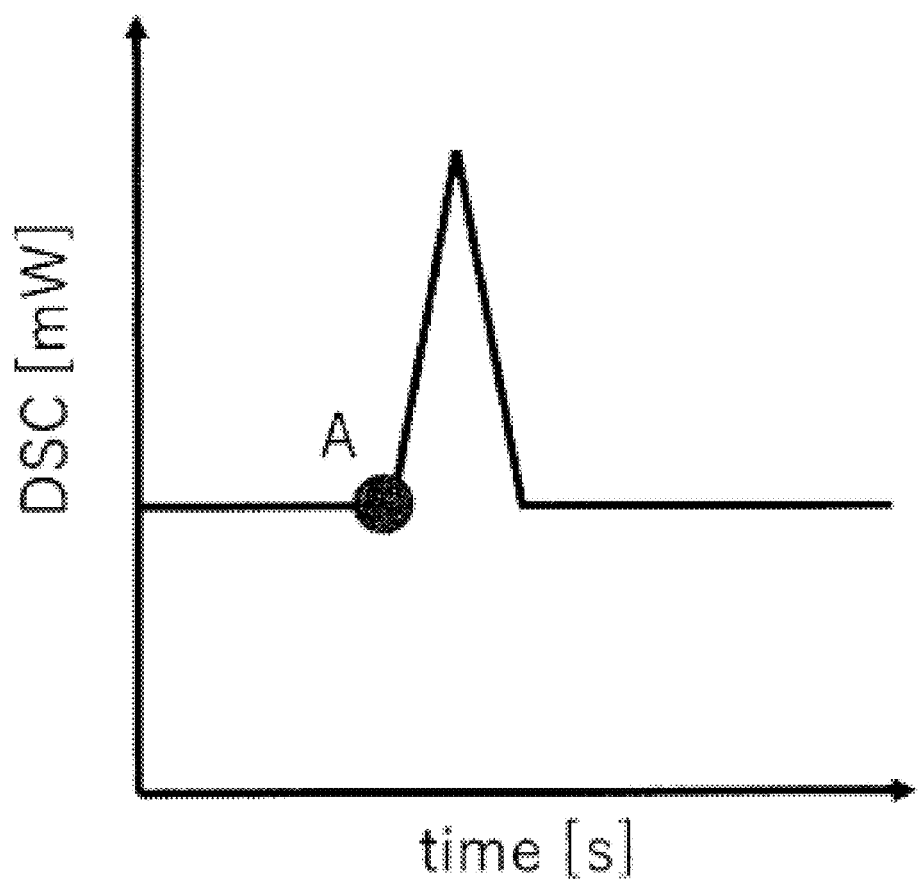

SOLDER ALLOY, SOLDER BALL, AND SOLDER JOINT

CROSS-REFERENCE TO RELATED APPLICATIONS

This application is the United States national phase of International Application No. PCT/JP2021/009530 filed Mar. 10, 2021, and claims priority to Japanese Patent Application No. 2020-048691 filed Mar. 19, 2020, the disclosures of which are hereby incorporated by reference in their entirety.

BACKGROUND

Field

The present invention relates to a solder alloy, a solder ball, and a solder joint.

Description of Related Art

In recent years, electronic devices are required to have higher integration and be lighter, thinner, and smaller. Accordingly, electronic components mounted on electronic devices are also required to be reduced in size or thickness. For example, a BGA (Ball Grid Array), an area array surface-mount package, is most commonly used as a semiconductor package satisfying these requirements. The BGA has external electrode terminals in which solder balls are arranged in a grid pattern at regular intervals on a mount substrate of the package. The solder balls are placed on electrodes and then melted by heating the entire mount substrate in a reflow furnace to form solder bumps.

An Sn—Ag—Cu-based solder alloy, typified by Sn-3.0Ag-0.5Cu, has been used in a conventional BGA. However, because this solder alloy has inferior wettability to an Sn—Pb-based solder alloy used in the past, peeling may occur at an interface between its electrode and the solder alloy due to impacts caused by a fall or the like.

Therefore, Patent Document 1 discloses a solder alloy that improves fall impact resistance and suppresses discoloration by adding predetermined amounts of Ni and P to the Sn—Ag—Cu-based solder alloy. It is described that when Ni is added to the Sn—Ag—Cu-based solder alloy, stress of $Cu_6Sn_5$ is relieved by replacing a Cu atomic site of $Cu_6Sn_5$ formed at the interface with Ni, and the impact resistance is improved.

Patent Document 2 discloses, as a solder alloy satisfying high heat cycle resistance in addition to impact resistance and yellowing suppression effect, a solder alloy containing one or more of P, Ge, Al, and Si in an Sn—Ag—Cu solder alloy and further containing Ni as one of the options.

Patent Document 3 discloses, as a solder alloy satisfying heat cycle resistance, impact resistance, and yellowing suppression, a solder alloy containing Ag or Cu and at least one of P, Ge, Ga, and Co in a predetermined amount in an Sn—Sb—Ni solder alloy.

Patent Document 4 discloses a solder alloy containing at least one selected from Bi, In, Sb, P, and Ge in an Sn—Ag—Cu—Ni solder alloy in order to improve fall impact resistance and suppress fusion failure, and discoloration. This Document describes that an intermetallic compound layer of $Cu_6Sn_5$ is made thin to improve the fall impact resistance, and precipitation of intermetallic compounds of Cu and Ni is suppressed to suppress the fusion failure of a solder ball and a solder paste. It is also described that discoloration is suppressed by adding P, Ge, or the like.

CITATION LIST

Patent Document

Patent Document 1: Japanese Patent No. 5030442
Patent Document 2: Japanese Patent No. 4144415
Patent Document 3: Japanese Unexamined Patent Application Publication No. 2004-141910
Patent Document 4: Japanese Patent No. 5633837

SUMMARY

As described above, the solder alloys disclosed in Patent Documents 1 to 4 are reported to exhibit high impact resistance and discoloration resistance. In particular, the solder alloys disclosed in Patent Documents 2 and 3 also exhibit excellent heat cycle resistance in addition to these properties, and the solder alloy disclosed in Patent Document 4 is an outstanding invention that can also suppress fusion failure in addition to these properties.

Although the solder alloys disclosed in Patent Documents 2 to 4 are considered capable of forming solder joints that hardly break, in order to check whether the solder joints are conductive, for example, it is necessary to conduct a continuity test by directly sticking a pin at a probe tip into a solder alloy constituting a solder joint. If the pin does not be stuck in the solder alloy well, a test object thereof may be judged to have a continuity failure despite its continuity, so that a problem such as an unnecessary deterioration of the yield may occur.

The solder alloys described in Patent Documents 1 to 4 have been studied with respect to impact resistance, discoloration resistance, and heat cycle resistance, but one of the most important properties in a solder joint is bonding strength. When an electronic component is mounted on a mount substrate, both the mount substrate and the electronic component are heated in a reflow furnace, but linear expansion coefficients of the mount substrate, the electronic component, and the solder alloy are different from each other. Therefore, when a molten solder solidifies by cooling, the stress is concentrated in the solder joint. If the bonding strength of the solder joint is weak, the solder joint breaks.

Thus, the solder alloy used to form the solder joint needs to satisfy the bonding strength as a mechanical property simultaneously in addition to pin contact performance for confirming an electrical property of the solder joint.

Although the solder alloys described in Patent Documents 1 to 4 are considered to be optimized to achieve each purpose, content of each constituent element that composes the solder alloy must be optimized according to the purpose because the solder joints need to satisfy various properties. Therefore, in order to solve the above-described problems, alloy compositions of the solder alloys described in Patent Documents 1 to 4 must be reexamined in detail.

An object of the present invention is to provide a solder alloy, a solder ball, and a solder joint which have a high yield due to their excellent pin contact performance and exhibit high bonding strength.

In a pre-production continuity test, it is necessary to confirm the continuity of several thousand to several tens of thousands of bonded sections on a printed circuit board. In a conventional continuity test, for example, a pin contact test is conducted by sticking a pin at a probe tip into a solder alloy constituting a solder joint. In a case where the pin does not be stuck in the solder alloy easily, it is judged to have a continuity failure and thus its testing yield deteriorates. For this reason, it must be ensured that the solder joint that is originally conductive is not judged to be non-conductive. An object of the present invention is to provide a solder alloy in which a bonded section having high bonding strength is obtained in addition to being hardly judged to have a continuity failure, as mentioned above. The present inventors have focused on the fact that "the pin can easily be stuck in the solder alloy" as one of the means to solve the problems of the present invention and studied it based on metallurgical findings of the solder alloy.

The ease of the pin sticking is not improved even if a probe pin or a measuring device is improved because it depends on alloy compositions of the solder alloys. Therefore, improvement must be inevitably made by the alloy compositions of the solder alloys in the current situation.

The present inventors have first focused on an influence of the grain size of crystalline phases constituting the solder alloy in order to improve the pin contact performance. It is presumed that when the crystal grain size is large, the pin can easily be stuck in the solder alloy since each crystalline phase is easily elastically deformed. Then, in the Sn—Ag—Cu—Ni—P solder alloy, in order to increase the crystal grain size of Sn, the present inventors have focused on the fact that the solidification starting temperature of the solder alloy needs to be higher. Specifically, they have focused on the fact that the higher the liquidus temperature, which corresponds to a solidification starting temperature of the solder alloy, the wider the temperature range up to the solidus temperature, which corresponds to a solidification ending temperature, and that Sn, an initial phase, grows during solidification.

In order to increase the crystal grain size, it is necessary to suppress supercooling during solidification. To achieve this, the present inventors thought that an alloy composition containing a predetermined amount of elements that act as solidification nuclei should be studied. However, if the liquidus temperature is too high, the solder alloy is difficult to melt at a normal reflow temperature. From these viewpoints, the present inventors dared to select P as an element that acts as a solidification nucleus, which has conventionally been contained as an element to suppress discoloration on the surface of solder alloys, and then investigated in detail a relationship with contents of each constituent element so that the liquidus temperature would not become too high. At this time, they also investigated the necessity of fining intermetallic compounds formed at the bonded interface in order to improve the bonding strength. In this study, the content of each constituent element was studied in detail in order to improve the pin contact performance and bonding strength of the Sn—Ag—Cu—Ni—P solder alloys disclosed in Patent Documents 1 to 4.

It was found that the solder alloy disclosed in Patent Document 1 has inferior pin contact performance or bonding strength because P content is not appropriate. It was found that the solder alloy disclosed in Patent Document 2 has room for improvement in its pin contact performance and bonding strength because Ag or P content is not appropriate. It was found that the solder alloy disclosed in Patent Document 3 has room for improvement in its pin contact performance because Sb is an essential element. It was found that the solder alloy disclosed in Patent Document 4 has room for improvement in its pin contact performance and bonding strength because Ag and P contents are not appropriate.

It was also found that Ge, Al, Si, and Sb, which are taken as elements equivalent to P in these Documents, do not act as solidification nuclei like P, and thus wettability deteriorates.

Therefore, the present inventors selected only Ag, Cu, Ni, and P as additive elements to optimize the Ag and P contents, and simultaneously investigated the optimal ranges of Cu and Ni contents. As a result, it was found that both pin contact performance and bonding strength are excellent when each constituent element is within a predetermined range, and the present invention was thus completed.

The present invention obtained from these finding are as follows.

(1) A solder alloy having an alloy composition consisting of, by mass %,
Ag: 0.8 to 1.5%,
Cu: 0.1 to 1.0%,
Ni: 0.01 to 0.10%, and
P: 0.006% to 0.009%, with the balance being Sn.
(2) The solder alloy according to (1) above,
wherein the alloy composition satisfies the following relations (1) and (2):

$$2.0 \leq Ag \times Cu \times Ni/P \leq 25 \quad \text{Relation (1)}$$

$$0.500 \leq Sn \times P \leq 0.778 \quad \text{Relation (2)}$$

wherein Ag, Cu, Ni, P, and Sn in the relations (1) and (2) each represent the contents (mass %) thereof in the alloy composition.
(3) The solder alloy according to (1) or (2) above,
wherein the alloy composition satisfies the following relation (3):

$$221 \leq (Ag+Cu+Ni)/P \leq 309 \quad \text{Relation (3)}$$

wherein Ag, Cu, Ni, and P in the relation (3) each represent the contents (mass %) thereof in the alloy composition.
(4) A solder alloy having an alloy composition consisting of, by mass %,
Ag: 0.8 to 1.5%,
Cu: 0.1 to 1.0%,
Ni: 0.01 to 0.10%, and
P: 0.005% to 0.009%, with the balance being Sn,
wherein the alloy composition satisfies the following relations (1) and (2):

$$2.0 \leq Ag \times Cu \times Ni/P \leq 25 \quad \text{Relation (1)}$$

$$0.500 \leq Sn \times P \leq 0.778 \quad \text{Relation (2)}$$

wherein Ag, Cu, Ni, P, and Sn in the relations (1) and (2) each represent the contents (mass %) thereof in the alloy composition.
(5) The solder alloy according to (4) above,
wherein the alloy composition satisfies the following relation (3):

$$221 \leq (Ag+Cu+Ni)/P \leq 309 \quad \text{Relation (3)}$$

wherein Ag, Cu, Ni, and P in the relation (3) each represent the contents (mass %) thereof in the alloy composition.
(6) A solder ball comprising the solder alloy according to any one of (1) to (5) above.

(7) A solder joint comprising the solder alloy according to any one of (1) to (5) above.

BRIEF DESCRIPTION OF THE DRAWING

FIG. 1 is a graph showing a DSC schematic curve to illustrate the solidification temperature in the present invention.

DETAILED DESCRIPTION

The present invention is described in more detail below. In the present description, "%" relating to the solder alloy composition refers to "mass %" unless otherwise specified.
1. Alloy Composition
(1) Ag: 0.8 to 1.5%

Ag is an element that lowers the melting point of a solder alloy and improves the wettability thereof. If the Ag content is less than 0.8%, the bonding strength deteriorates since compounds with Sn are not sufficiently produced, and a large amount of compounds with Sn and Cu is formed at the bonded interface. The melting point rises too high, and the solder alloy is difficult to melt. Furthermore, the bonding strength is reduced by a decrease in wettability. In terms of the lower limit, the Ag content is 0.8% or more, preferably 1.0% or more, more preferably 1.1% or more, and particularly preferably 1.2% or more. On the other hand, if the Ag content is too large, the pin contact performance deteriorates since the strength of the solder alloy is too high to allow the pins to stick. In terms of the upper limit, the Ag content is 1.5% or less, preferably 1.4% or less, and more preferably 1.3% or less.
(2) Cu: 0.1 to 1.0%

Cu is an element that improves the bonding strength by forming an appropriate amount of a CuSn compound at the bonded interface. If the Cu content is within the above range, it is possible to maintain high pin contact performance because the solder alloy is appropriately deformed. If the Cu content is less than 0.1%, the bonding strength is not improved since the amount of the CuSn compound precipitated is small. In terms of the lower limit, the Cu content is 0.1% or more, preferably 0.3% or more, more preferably 0.4% or more, and particularly preferably 0.5% or more. On the other hand, if the Cu content exceeds 1.0%, the bonding strength and the pin contact performance are reduced due to too large amount of the CuSn compound precipitated. The melting point rises, the liquidus temperature of the solder alloy is high, and the solder alloy is difficult to melt. In terms of the upper limit, the Cu content is 1.0% or less, preferably 0.8% or less, more preferably 0.7% or less, and particularly preferably 0.6% or less.
(3) Ni: 0.01 to 0.10%

Ni is an element that makes the CuSn compound formed at the bonded interface fine and also improves bonding reliability. Furthermore, if the Ni content is within the above range, it is possible to maintain high pin contact performance because the solder alloy is appropriately deformed. If the Ni content is less than 0.01%, the bonding strength deteriorates since the minuteness of the CuSn compounds is insufficient. In terms of the lower limit, the Ni content is 0.01% or more, preferably 0.02% or more, more preferably 0.03% or more, even more preferably 0.04% or more, and particularly preferably 0.05% or more. On the other hand, if the Ni content exceeds 0.10%, an NiSn compound precipitates, and consequently the bonding strength and the pin contact performance are reduced. The bonding strength is also reduced by an increase in the melting point and a decrease in wettability. The liquidus temperature of the solder alloy is high, and the solder alloy is difficult to melt. In terms of the upper limit, the Ni content is 0.10% or less, preferably 0.07% or less, and more preferably 0.06% or less.
(4) P: 0.006% to 0.009%

P is an element that acts as a solidification nucleus of Sn, the initial phase during cooling of the molten solder, and contributes to the coarsening of the Sn crystalline phase by promoting a high solidification point. Supercooling represents a non-solidified state at a temperature of solidification in an equilibrium state and results in a state in which the Sn phase, which originally begins to precipitate as the initial phase, does not precipitate. Therefore, the present invention has been made focusing on the fact that P, which is conventionally used as an element that functions on the surface of a solder alloy to inhibit oxidation or discoloration of the solder alloy, functions as a solidification nucleus. As a result, it is presumed that supercooling is suppressed by dispersing P in the molten solder and functioning as a solidification nucleus, and Sn which is the initial phase precipitates during solidification, and the crystal grain size of the Sn crystalline phase increases.

If the P content is less than 0.006%, there are few solidification nuclei, the crystalline phase does not precipitate even when cooled to the temperature at which the crystalline phase originally begins to precipitate, and supercooling phenomenon occurs. Therefore, rapid solidification occurs when the temperature drops below a predetermined degree, Sn in the initial phase cannot become larger, and the crystal grain size of Sn becomes smaller. As a result, the pin contact performance is reduced. In terms of the lower limit, the P content is 0.006% or more. On the other hand, if the P content is too large, the bonding strength is reduced because a large amount of P oxides is formed on the surface of the solder alloy. The bonding strength is also reduced by an increase in melting point and a decrease in wettability. In terms of the upper limit, the P content is 0.009% or less, preferably 0.008% or less, and more preferably 0.007% or less.
(5) Balance: Sn The balance of the solder alloy according to the present invention is Sn. In addition to the above-described elements, unavoidable impurities may be contained. Even if unavoidable impurities are contained, the above-mentioned effects are not affected. Even if the present invention contains elements better not to be contained, which are described later, as unavoidable impurities, the effects of the present invention are not impaired. Sb, Ge, Al, and Si are better not to be contained in the present invention because they do not act as solidification nuclei like P but cause a decrease in wettability and inhibit normal wetting to reduce the bonding strength.
(6) Relations (1) and (2)

The present invention preferably satisfies the following relations (1) and (2):

$$2.0 \leq Ag \times Cu \times Ni/P \leq 25 \quad \text{Relation (1)}$$

$$0.500 \leq Sn \times P \leq 0.778 \quad \text{Relation (2)}$$

wherein Ag, Cu, Ni, P, and Sn in the relations (1) and (2) each represent the contents (mass %) in the alloy composition.

The solder alloy according to the present invention preferably satisfies the relation (1). The pin contact performance and bonding strength are further improved because the balance of Ag, Cu, Ni and P contents is optimized by satisfying the relation (1). In the relation (1), P functions as a solidification nucleus of the Sn crystalline phase, and Ag, Cu, and Ni are elements that form compounds with Sn. Thus, if the content ratio of Ag, Cu, and Ni to P is appropriate, both effects in the present invention are further enhanced.

In terms of the lower limit, the relation (1) is preferably 2.0 or more, more preferably 3.3 or more, even more preferably 4.0 or more, and particularly preferably 5.0 or more. In terms of the upper limit, the relation (1) is preferably 25 or less, more preferably 20 or less, even more preferably 15 or less, particularly preferably 10 or less, and most preferably 6.25 or less.

In the relation (2), if the balance between Sn content and P content is appropriate, the pin contact performance is especially improved since P contributes to an increase in the crystal grain size of Sn. In addition, if the P content is appropriate relative to the Sn content, the formation of a hard SnP compound on the surface of the solder alloy is suppressed, and high pin contact performance is achieved.

In terms of the lower limit, the relation (2) is preferably 0.500 or more, more preferably 0.520 or more, even more preferably 0.530 or more, even yet more preferably 0.550 or more, particularly preferably 0.584 or more, and most preferably 0.589 or more. In terms of the upper limit, the relation (1) is preferably 0.778 or less, more preferably 0.750 or less, even more preferably 0.700 or less, particularly preferably 0.650 or less, and most preferably 0.592 or less.

As mentioned above, if the content ratio of Ag, Cu, and Ni to P is optimized by satisfying the relations (1) and (2), both effects in the present invention are further enhanced. In this case, the P content may be 0.005% to 0.009%.

(7) Relation (3)

The present invention preferably satisfies the following relation (3):

$$221 \leq (Ag+Cu+Ni)/P \leq 309 \qquad \text{Relation (3)}$$

wherein Ag, Cu, Ni, and P in the relation (3) each represent the contents (mass %) in the alloy composition.

The solder alloy according to the present invention preferably satisfies the relation (3). The relation (3) represents the balance between the total content of Ag, Cu, and Ni and the P content. In the solder alloy according to the present invention, Ag, Cu, and Ni are elements capable of forming compounds with Sn, while P is an element that contributes to the precipitation of the Sn phase. When the relation (3) is satisfied, the pin content performance and bonding strength are further improved because the Sn compound and the Sn phase are precipitated in good balance.

In terms of the lower limit, the relation (3) is preferably 221 or more, more preferably 225 or more, even more preferably 258 or more, even yet more preferably 275 or more, particularly preferably 286 or more, and most preferably 288 or more, or may be 290 or more. In terms of the upper limit, the relation (1) is preferably 309 or less, more preferably 308 or less, even more preferably 300 or less, even yet more preferably 293 or less, particularly preferably 292 or less, and most preferably 291 or less.

(8) Solidification Temperature (Liquidus Temperature) of Solder Alloy

The solder alloy according to the present invention preferably has a liquidus temperature, which corresponds to a solidification temperature representing a solidification starting temperature, of 200° C. or higher. If the Sn—Ag—Cu—Ni—P solder alloy according to the present invention has a liquidus temperature of 200° C. or higher, the Sn crystalline phase grows sufficiently during the solidification of the molten solder to provide good pin contact performance. The liquidus temperature in the present invention is preferably 205° C. or higher and particularly preferably 210° C. or higher.

2. Solder Ball

The solder alloy according to the present invention can be used as a solder ball. The solder ball according to the present invention is used for forming bumps on electrodes and substrates of semiconductor packages such as BGAs (ball grid arrays). The diameter of the solder ball according to the present invention is preferably in the range of 1 to 1,000 m. The solder ball can be manufactured by a general solder ball manufacturing method.

3. Solder Joint

The solder joint according to the present invention establishes a connection between an IC chip for a semiconductor package and its substrate (interposer) or a connection by bonding the semiconductor package to a printed wiring board. In other words, the solder joint according to the present invention is defined as a connection part for an electrode and can be formed using general soldering conditions.

4. Pin Contact Test

The pin contact performance in the present invention is evaluated by a pin contact test in which a pin is stuck in a solder joint. The purpose of an ICT (in-circuit test), an electrical testing of substrates conducted by way of pin contact, is to determine whether a product is good or not. Therefore, the pin contact test is a general-purpose test carried out on BGA components and chip components, but also on any contact points where electrical connection can be confirmed. An ICT device is a general device in substrate mounting, and is used to confirm the continuity of various components on a printed wiring board without being limited to BGAs.

Even if the continuity can be confirmed in advance with a tester for the prepared test pieces, it is necessary to evaluate each pin contact performance. The pin-contact test is a test to confirm that solder joints are conductive, and the ease of probe pin sticking affects its yield. Therefore, in order to evaluate the influence of the ease of the probe pin sticking, it is necessary to confirm in advance that continuity is achieved other than in the pin-contact test.

In a case where the pin contact performance of a solder bump whose continuity has not been confirmed is evaluated and a continuity failure occurs, it will be difficult to determine whether the cause of the continuity failure is due to a continuity failure in the pin contact test. Therefore, the reliability of the pin-contact test will be lost without prior confirmation by a tester or the like that there are no continuity failures. Accordingly, in order to conduct a pin contact test, it is necessary to confirm continuity for all solder bumps using a tester or similar device that measures electrical resistance.

Here, if it is possible to confirm continuity with a tester, evaluation of pin contact performance might be unnecessary. However, since the pin contact test is now most commonly used to evaluate the continuity of a solder joint, a solder alloy with fewer continuity failures in the pin contact test is required in the electronic component industry. More specifically, in the continuity test of electronic components, it is necessary to confirm the continuity of a very large number of solder joints, ranging from several thousand to several tens of thousands, but normal tester-based continuity checks only involve touching the surface of the solder joints. Thus, there is a problem that the measured yield is very low. In recent years, automated testing using flying probe testers and the like has become common, and pin contact tests are used in such automated testing. Therefore, even if the continuity can be confirmed in advance with a tester for the prepared test pieces, it is necessary to evaluate each pin contact performance.

5. Other

A bonding method using a solder alloy according to the present invention may be performed according to an ordinary method, for example, using a reflow method. The heating temperature may be appropriately adjusted depending on a heat resistance of the chip or the liquidus temperature of the solder alloy. A melting temperature of the solder alloy may be approximately 20° C. higher than the liquidus temperature from the viewpoint of suppressing thermal damage to the chip. In a case where bonding is conducted by using the solder alloy according to the present invention, the structure can be further made minuteness by considering a cooling rate during solidification. For example, the solder joint may be cooled at a cooling rate of 2 to 3° C./s or higher. Other bonding conditions can be appropriately adjusted depending on the alloy composition of the solder alloy.

The solder alloy according to the present invention enables a low α-ray alloy to be produced by using a low α-ray material as a raw material therefor. When such a low α-ray-alloy is used for forming solder bumps in the periphery of a memory, soft errors can be suppressed.

EXAMPLES

For the solder alloys constituted from alloy compositions as shown in Table 1, the solidification temperature, pin contact performance, and bonding strength were evaluated as follows. The tensile strength was also evaluated.

(1) Solidification Temperature

Each solder alloy as shown in Table 1 was prepared, and the solidification temperature (liquidus temperature) of the molten solder was measured. The measurement was performed using a DSC (Q2000: manufactured by TA Instruments) apparatus by increasing the temperature to 300° C. and then cooling to 100° C. at a cooling rate of 24° C./min. Because solidification is accompanied with an exothermic reaction, an exothermic peak appears on the DSC curve as shown in FIG. 1. The solidification starting temperature (liquidus temperature during solidification), which corresponds to the solidification temperature to be measured in the examples, was defined as an exothermic onset temperature and indicated as point A in FIG. 1.

When the solidification temperature was 200° C. or higher, it was rated as "B", and when the solidification temperature was less than 200° C., it was rated as "D".

(2) Pin Contact Performance

A solder ball having a diameter of 0.6 mm was prepared from each of the solder alloys shown in Table 1. The prepared solder ball was soldered to a substrate having a thickness of 1.2 mm and an electrode size of 0.5 mm in diameter (Cu-OSP). The number of solder balls soldered was 60. As for the soldering conditions, a flux (manufactured by SENJU METAL INDUSTRY CO., LTD.: WF-6400) was applied onto an electrode, and soldering was conducted using a reflow apparatus (manufactured by SENJU METAL INDUSTRY CO., LTD.: SNR-615) under a reflow profile with a peak temperature of 245° C. and a cooling rate of 2° C./s.

After all of the prepared test pieces were confirmed to be conductive, each solder bump was tested for continuity using IN-CIRCUIT HITESTER (model: 1220) manufactured by HIOKI E.E. CORPORATION with a pin push-in depth of 2 mm to contact the tip of the pin with the bump. When the proportion of energized solder bumps was 95% or more, it was rated as "A", when the proportion of energized solder bumps was less than 95% and 90% or more, it was rated as "B", and when the proportion of energized solder bumps was less than 90%, it was rated as "D".

(3) Bonding Strength

A solder ball having a diameter of 0.6 mm was prepared from each of the solder alloys shown in Table 1. The prepared solder ball was soldered to a substrate having a thickness of 1.2 mm and an electrode size of 0.5 mm in diameter (Cu-OSP). The number of solder balls soldered was 5. As for the soldering conditions, a flux (manufactured by SENJU METAL INDUSTRY CO., LTD.: WF-6400) was applied onto an electrode, and soldering was conducted using a reflow apparatus (manufactured by SENJU METAL INDUSTRY CO., LTD.: SNR-615) under a reflow profile with a peak temperature of 245° C. and a cooling rate of 2° C./s.

The prepared test pieces were each subjected to a shear strength test under the conditions of a shear rate of 1,000 mm/s in a shear strength measuring device (manufactured by Nordson Dage: SERIES 4000HS).

When the average bonding strength of five pieces was 4.6N or more, it was rated as "A", when the average bonding strength was 3.2N or more and less than 4.6 N, it was rated as "B", and when the average bonding strength was less than 3.2N, it was rated as "D". In the examples, "A" and "B" were evaluated as having no practical problems with bonding strength.

The results are shown in Tables 1 and 2.

TABLE 1

| | Solder Composition (mass %) | | | | | | | | Relation (1) | Relation (2) | Relation (3) | Solidification Temperature | Pin Contact Performance | Bonding Strength |
|---|---|---|---|---|---|---|---|---|---|---|---|---|---|---|
| | Sn | Ag | Cu | Ni | P | Sb | Ge | Al | Si | | | | | | |
| Ex. 1 | Bal. | 0.8 | 0.5 | 0.05 | 0.006 | | | | | ○ | ○ | ○ | B | A | A |
| Ex. 2 | Bal. | 1.0 | 0.5 | 0.05 | 0.006 | | | | | ○ | ○ | ○ | B | A | A |
| Ex. 3 | Bal. | 1.1 | 0.5 | 0.05 | 0.006 | | | | | ○ | ○ | ○ | B | A | A |
| Ex. 4 | Bal. | 1.2 | 0.5 | 0.05 | 0.006 | | | | | ○ | ○ | ○ | B | A | A |
| Ex. 5 | Bal. | 1.3 | 0.5 | 0.05 | 0.006 | | | | | ○ | ○ | ○ | B | A | A |
| Ex. 6 | Bal. | 1.4 | 0.5 | 0.05 | 0.006 | | | | | ○ | ○ | x | B | A | A |
| Ex. 7 | Bal. | 1.5 | 0.5 | 0.05 | 0.006 | | | | | ○ | ○ | x | B | A | A |
| Ex. 8 | Bal. | 1.2 | 0.1 | 0.05 | 0.006 | | | | | x | ○ | ○ | B | A | B |
| Ex. 9 | Bal. | 1.2 | 0.3 | 0.05 | 0.006 | | | | | ○ | ○ | ○ | B | A | A |
| Ex. 10 | Bal. | 1.2 | 0.4 | 0.05 | 0.006 | | | | | ○ | ○ | ○ | B | A | A |
| Ex. 11 | Bal. | 1.2 | 0.7 | 0.05 | 0.006 | | | | | ○ | ○ | x | B | A | A |
| Ex. 12 | Bal. | 1.2 | 0.8 | 0.05 | 0.006 | | | | | ○ | ○ | x | B | A | A |
| Ex. 13 | Bal. | 1.2 | 1.0 | 0.05 | 0.006 | | | | | ○ | ○ | x | B | A | A |
| Ex. 14 | Bal. | 1.2 | 0.5 | 0.01 | 0.006 | | | | | x | ○ | ○ | B | A | B |

TABLE 1-continued

| | Solder Composition (mass %) | | | | | | | | | Relation (1) | Relation (2) | Relation (3) | Solidification Temperature | Pin Contact Performance | Bonding Strength |
|---|---|---|---|---|---|---|---|---|---|---|---|---|---|---|---|
| | Sn | Ag | Cu | Ni | P | Sb | Ge | Al | Si | | | | | | |
| Ex. 15 | Bal. | 1.2 | 0.5 | 0.02 | 0.006 | | | | | ○ | ○ | ○ | B | A | A |
| Ex. 16 | Bal. | 1.2 | 0.5 | 0.03 | 0.006 | | | | | ○ | ○ | ○ | B | A | A |
| Ex. 17 | Bal. | 1.2 | 0.5 | 0.04 | 0.006 | | | | | ○ | ○ | ○ | B | A | A |
| Ex. 18 | Bal. | 1.2 | 0.5 | 0.06 | 0.006 | | | | | ○ | ○ | ○ | B | A | A |
| Ex. 19 | Bal. | 1.2 | 0.5 | 0.07 | 0.006 | | | | | ○ | ○ | ○ | B | A | A |
| Ex. 20 | Bal. | 1.2 | 0.5 | 0.1 | 0.006 | | | | | ○ | ○ | ○ | B | A | A |
| Ex. 21 | Bal. | 1.2 | 0.5 | 0.05 | 0.0051 | | | | | ○ | ○ | ○ | B | A | A |
| Ex. 22 | Bal. | 1.2 | 0.5 | 0.05 | 0.007 | | | | | ○ | ○ | ○ | B | A | A |
| Ex. 23 | Bal. | 1.2 | 0.5 | 0.05 | 0.008 | | | | | ○ | x | x | B | B | A |
| Ex. 24 | Bal. | 1.2 | 0.5 | 0.05 | 0.009 | | | | | ○ | x | x | B | B | A |
| Ex. 25 | Bal. | 1.2 | 0.2 | 0.07 | 0.009 | | | | | x | x | x | B | B | B |

Ex = Example

TABLE 2

| | Solder Composition (mass %) | | | | | | | | | Relation (1) | Relation (2) | Relation (3) | Solidification Temperature | Pin Contact Performance | Bonding Strength |
|---|---|---|---|---|---|---|---|---|---|---|---|---|---|---|---|
| | Sn | Ag | Cu | Ni | P | Sb | Ge | Al | Si | | | | | | |
| Comp. Ex. 1 | Bal. | <u>2.0</u> | 0.5 | 0.05 | 0.006 | | | | | ○ | ○ | x | B | D | B |
| Comp. Ex. 2 | Bal. | <u>0.5</u> | 0.5 | 0.05 | 0.006 | | | | | ○ | ○ | x | B | A | D |
| Comp. Ex. 3 | Bal. | 1.2 | <u>2.0</u> | 0.05 | 0.006 | | | | | ○ | ○ | x | B | A | D |
| Comp. Ex. 4 | Bal. | 1.2 | <u>0.05</u> | 0.05 | 0.006 | | | | | x | ○ | x | B | A | D |
| Comp. Ex. 5 | Bal. | 1.2 | 0.5 | <u>0.2</u> | 0.006 | | | | | ○ | ○ | x | B | A | D |
| Comp. Ex. 6 | Bal. | 1.2 | 0.5 | <u>0.005</u> | 0.006 | | | | | x | ○ | ○ | B | A | D |
| Comp. Ex. 7 | Bal. | 1.2 | 0.5 | 0.05 | <u>0.01</u> | | | | | ○ | x | x | B | B | D |
| Comp. Ex. 8 | Bal. | 1.2 | 0.5 | 0.05 | <u>0.005</u> | | | | | ○ | x | x | D | D | B |
| Comp. Ex. 9 | Bal. | <u>2.0</u> | 0.5 | 0.05 | 0.008 | | | | | ○ | x | x | B | D | B |
| Comp. Ex. 10 | Bal. | 1.2 | 0.5 | 0.05 | 0.006 | 0.01 | | | | ○ | ○ | ○ | D | D | B |
| Comp. Ex. 11 | Bal. | 1.2 | 0.5 | 0.05 | <u>0</u> | | 0.006 | | | x | x | x | D | D | D |
| Comp. Ex. 12 | Bal. | 1.2 | 0.5 | 0.05 | <u>0</u> | | | 0.006 | | x | x | x | D | D | D |
| Comp. Ex. 13 | Bal. | 1.2 | 0.5 | 0.05 | <u>0</u> | | | | 0.006 | x | x | x | D | D | D |

Comp. Ex. = Comparative Example

The underline indicates that it does not fall within the scope of the present invention.

As shown in Table 1, according to Examples 1 to 25, because the content of each constituent element was adjusted for all the alloy compositions, it was found that the solidification temperature was high, and the pin contact performance was excellent, and the bonding strength was also excellent. In addition, because Examples 1 to 5, 9 to 10, and 15 to 22 satisfied the relations (1) to (3), it was found that both the pin contact performance and the bonding strength were extremely excellent.

On the other hand, Comparative Examples 1 and 9 were inferior in pin contact performance due to high Ag content. Because Comparative Examples 2 had a low Ag content, Comparative Examples 3 had a high Cu content, Comparative Examples 4 had a low Cu content, Comparative Examples 5 had a high Ni content, Comparative Examples 6 had a low Ni content, and Comparative Examples 7 had a high P content, they were inferior in bonding strength. Comparative Example 8 was inferior in pin contact performance due to low P content.

Comparative Example 10 was inferior in pin contact performance because it contained Sb. Comparative Examples 11 to 13 were inferior in pin contact performance and bonding strength because they did not contain P but each contained Ge, Al, and Si.

The invention claimed is:

1. A solder alloy having an alloy composition consisting of, by mass %:
   Ag: 0.8 to 1.5%,
   Cu: 0.1 to 1.0%,
   Ni: 0.01 to 0.10%, and
   P: 0.006% to 0.009%, with the balance being Sn.

2. A solder ball comprising the solder alloy according to claim 1.

3. A solder joint comprising the solder alloy according to claim 1.

4. The solder alloy according to claim 1, wherein the alloy composition satisfies the following relation (3):

$$221 \leq (Ag+Cu+Ni)/P \leq 309 \quad \text{Relation (3)}$$

wherein Ag, Cu, Ni, and P in the relation (3) each represent the contents (mass %) thereof in the alloy composition.

5. A solder ball comprising the solder alloy according to claim 4.

6. A solder joint comprising the solder alloy according to claim 4.

7. The solder alloy according to claim 1, wherein the alloy composition satisfies the following relations (1) and (2):

$$2.0 \leq Ag \times Cu \times Ni/P \leq 25 \quad \text{Relation (1)}$$

$$0.500 \leq Sn \times P \leq 0.778 \quad \text{Relation (2)}$$

wherein Ag, Cu, Ni, P, and Sn in the relations (1) and (2) each represent the contents (mass %) thereof in the alloy composition.

8. A solder ball comprising the solder alloy according to claim 7.

9. A solder joint comprising the solder alloy according to claim 7.

10. The solder alloy according to claim 7, wherein the alloy composition satisfies the following relation (3):

$$221 \leq (Ag+Cu+Ni)/P \leq 309 \quad \text{Relation (3)}$$

wherein Ag, Cu, Ni, and P in the relation (3) each represent the contents (mass %) thereof in the alloy composition.

11. A solder ball comprising the solder alloy according to claim 10.

12. A solder joint comprising the solder alloy according to claim 10.

13. A solder alloy having an alloy composition consisting of, by mass %:
Ag: 0.8 to 1.5%,
Cu: 0.1 to 1.0%,
Ni: 0.01 to 0.10%, and
P: 0.0051% to 0.009%, with the balance being Sn,
wherein the alloy composition satisfies the following relations (1) and (2):

$$2.0 \leq Ag \times Cu \times Ni/P \leq 25 \quad \text{Relation (1)}$$

$$0.500 \leq Sn \times P \leq 0.778 \quad \text{Relation (2)}$$

wherein Ag, Cu, Ni, P, and Sn in the relations (1) and (2) each represent the contents (mass %) thereof in the alloy composition.

14. A solder ball comprising the solder alloy according to claim 13.

15. A solder joint comprising the solder alloy according to claim 13.

16. The solder alloy according to claim 13, wherein the alloy composition satisfies the following relation (3):

$$221 \leq (Ag+Cu+Ni)/P \leq 309 \quad \text{Relation (3)}$$

wherein Ag, Cu, Ni, and P in the relation (3) each represent the contents (mass %) thereof in the alloy composition.

17. A solder ball comprising the solder alloy according to claim 16.

18. A solder joint comprising the solder alloy according to claim 16.

* * * * *